(12) United States Patent
Ohnishi (10) Patent No.: US 7,258,576 B2
(45) Date of Patent: Aug. 21, 2007

(54) SENSOR DEVICE

(75) Inventor: Jun Ohnishi, Mizuho (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/481,990

(22) Filed: Jul. 6, 2006

(65) Prior Publication Data

US 2007/0010138 A1    Jan. 11, 2007

(30) Foreign Application Priority Data

Jul. 8, 2005    (JP)    ............... 2005-200548

(51) Int. Cl.
*H01R 13/66* (2006.01)
(52) U.S. Cl. ................................ 439/620.01
(58) Field of Classification Search ................ 439/736, 439/735, 620.01, 620.21, 620.22
See application file for complete search history.

(56) References Cited

U.S. PATENT DOCUMENTS 5,343,757 A * 9/1994 Tate ............................. 73/724
6,157,186 A  12/2000 Aoki et al.
6,958,674 B2 * 10/2005 Tsuchida .................... 338/276
2004/0201464 A1  10/2004 Oonishi

FOREIGN PATENT DOCUMENTS

| EP | 1 443 331 A2 | 8/2004 |
|---|---|---|
| GB | 2 326 948 | 1/1999 |
| JP | 2001-053475 | 2/2001 |
| JP | 2002-026197 | 1/2002 |

OTHER PUBLICATIONS

Extended Search Report issued Nov. 8, 2006 in the corresponding European Patent Application No. 06013845.0.

* cited by examiner

*Primary Examiner*—Phuong Dinh
(74) *Attorney, Agent, or Firm*—Harness, Dickey & Pierce, PLC

(57) ABSTRACT

A sensor device has a sensing portion, a connector terminal, and a case housing the sensing portion therein and forming a terminal fixing portion. The connector terminal has a fixed portion fixed in the terminal fixing portion of the case. The connector terminal is electrically connected to the sensing portion through a lead for allowing signal transmission between the sensing portion and an external device. A ratio of the volume of the fixed portion of the connector terminal to the volume of the fixing portion of the case is equal to or greater than a predetermined ratio.

9 Claims, 6 Drawing Sheets

SENSOR DEVICE

CROSS REFERENCE TO RELATED APPLICATION

This application is based on Japanese Patent Application No. 2005-200548 filed on Jul. 8, 2005, the disclosure of which is incorporated herein by reference.

FIELD OF THE INVENTION

The present invention relates to a sensor device for detecting a physical displacement.

BACKGROUND OF THE INVENTION

Sensor devices that detect physical displacement are for example used in a vehicle air bag system for detecting an impact applied to a vehicle at a time of collision. Air bags of the air bag system are triggered based on detection signals produced from the sensor devices, thereby protecting passengers. This kind of collision detecting sensor device is for example disclosed in Japanese Patent Publication No. 2004-294419 (US 2004/0201464 A1).

In the above publication, the sensor device includes a G sensor that produces a signal in response to acceleration due to the collision impact. The G sensor includes a detecting portion, a communication portion, a power source circuit and the like. These elements are packaged. The G sensor is housed in a sensor housing portion of a resinous case. In the resinous case, a connector terminal is integrally fixed such that an end of the connector terminal extends into the sensor housing portion. The G sensor is connected to the end of the connector terminal through a metal lead so as to be electrically connected to an external device through the connector terminal.

In a vehicle, such a collision detecting sensor device is generally located at a position affected by heat such as in an engine compartment. If a temperature largely changes, respective elements of the sensor device thermally expand or contract. In particular, the resinous case has a coefficient of linear expansion generally larger than those of other elements. Namely, the size of the case relatively largely changes with temperature. When the size of the case changes, the connector terminal fixed in the case displaces. As a result, a connecting portion between the connector terminal and the lead and a connecting portion between the lead and the G sensor are likely to receive excessive stress, resulting in breaks in these connecting portions.

SUMMARY OF THE INVENTION

The present invention is made in view of the foregoing matter, and it is an object to provide a sensor device capable of reducing stresses applied to connecting portions therein irrespective of thermal expansion or thermal contraction of a resinous case.

According to a first aspect of the invention, a sensor device has a sensing portion for sensing a physical value, a resinous case housing the sensing portion therein, and a connector terminal having a fixed portion. The connector terminal is electrically connected to the sensing portion through a lead for allowing signal transmission between the sensing portion and an external device. The fixed portion of the connector terminal is fixed in a fixing portion of the case. Further, a ratio of a volume of the fixed portion of the connector terminal to a volume of the fixing portion of the case is equal to or greater than a predetermined ratio.

In the sensor device, the fixing portion of the case is made of resin having a coefficient of liner expansion larger than a coefficient of the fixed portion of the connector terminal, which is made of metal. Since the ratio of the volume of the fixed portion of the connector terminal to the volume of the fixing portion of the case is equal to or greater than the predetermined ratio, stresses applied to the connector terminal are reduced without requiring additional elements and changing a material, even if the case is thermally expanded and contracted. Accordingly, damage to connecting portions between the sensing portion and the lead and between the lead and the connector terminal can be reduced.

According to a second aspect of the invention, the fixed portion of the connector terminal has a base wall embedded in the fixing portion of the case in a predetermined depth from a wall of the fixing portion of the case, the wall defining a cavity in which the sensing portion is disposed. The predetermined depth is equal to or smaller than one-third of a dimension of the fixing portion of the case, the dimension defined in a direction perpendicular to the wall of the fixing portion.

Accordingly, the volume of resin between the wall of the cavity and the base wall of the connector terminal reduces. Therefore, stresses applied to the connector terminal are reduced even if the case is thermally expanded and contracted, similar to the first aspect. As a result, damage to connecting portions between the sensing portion and the lead and between the lead and the connector terminal can be reduced.

According to a third aspect of the invention, the fixed portion of the connector terminal has a base wall fixed in the fixing portion of the case. The base wall has an area equal to or greater than a cross sectional area of the fixing portion of the case taken in a direction parallel to the base wall.

Accordingly, the volume of resin on the periphery of the base wall is reduced. As such, stresses applied to the connector terminal are reduced, even if the case is thermally expanded and contracted, similar to the first and second aspects. Therefore, damage to connecting portions between the sensing portion and the lead and between the lead and the connector terminal can be reduced.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXAMPLE EMBODIMENT

An example embodiment of the present invention will now be described with reference to FIGS. 1 to 6C. A sensor device of the present invention is for example employed as a collision detecting sensor device for an air bag system of a vehicle.

Figure 1:
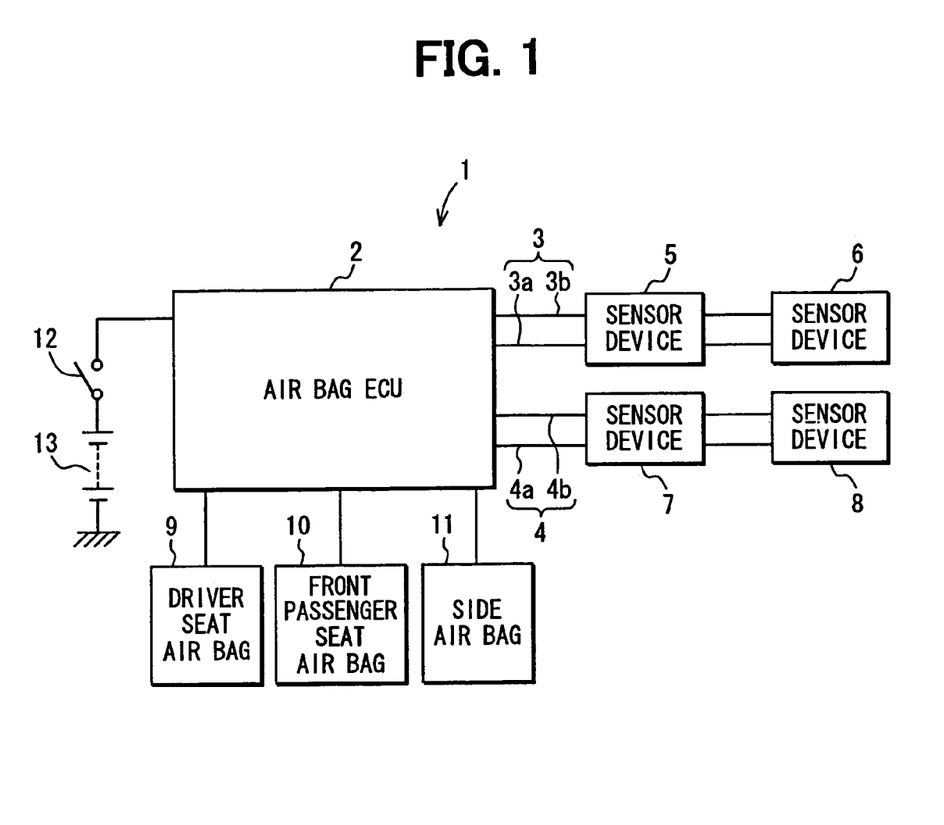
FIG. 1 is a schematic block diagram of an air bag system having sensor devices according to an example embodiment of the present invention.

As shown in FIG. 1, an air bag system 1 has an air bag ECU 2, a first communication bus 3, a second communication bus 4, sensor devices 5 to 8 for detecting a collision, a driver seat air bag 9, a front passenger seat air bag 10 and side air bags 11. The air bag ECU 2 is connected to a battery 13 through an ignition switch 12.

The air bag ECU 2 triggers the air bags 9 to 11 based on acceleration detected by the sensor devices 5 to 8 and acceleration detected by a sensor provided therein. The air bag ECU 2 is located in a substantially middle part of the vehicle.

The communication buses 3, 4 are provided as lines for supplying power voltages to the sensor devices 5 to 8 from the air bag ECU 2 and transmitting commands and data between the air bag ECU 2 and the sensor devices 5 to 8. The first communication bus 3 includes base lines 3a and transmission lines 3b for connecting between the air bag ECU 2 and the sensor device 5 and between the sensor device 5 and the sensor device 6. Likewise, the second communication bus 4 includes base lines 4a and transmission lines 4b for connecting between the air bag ECU 2 and the sensor device 7 and between the sensor device 7 and the sensor device 8.

Each of the sensor devices 5 to 8 detects acceleration in a predetermined direction at a predetermined position in the vehicle. In response to a data transmission request command transmitted from the air bag ECU 2, the sensor device 5 to 8 sends a detection result as in acceleration data to the air bag ECU 2 through the communication bus 3, 4.

Specifically, the sensor devices 5 to 8 are mounted in crushable zones of the vehicle and detect acceleration in a vehicle front and rear direction or a vehicle right and left direction. The sensor devices 5, 6 are connected to the air bag ECU 2 in series through the first communication bus 3. Likewise, the sensor devices 7, 8 are connected to the air bag ECU 2 in series through the second communication bus 4.

The driver seat air bag 9 is arranged in front of a driver seat. The front passenger seat air bag 10 is arranged in front of a front passenger seat. The side air bags 11 are arranged on the sides of the driver seat and the front passenger seat. These air bags 9 to 11 expand based on instructions from the air bag ECU 2 for protecting passengers at a time of collision.

Next, structure of the sensor devices 5 to 8 will be described with reference to FIGS. 2 to 6C. The sensor deices 5 to 8 have the same structure. Hereafter, the structure of the sensor device 5 will be exemplarily described.

Figure 2:
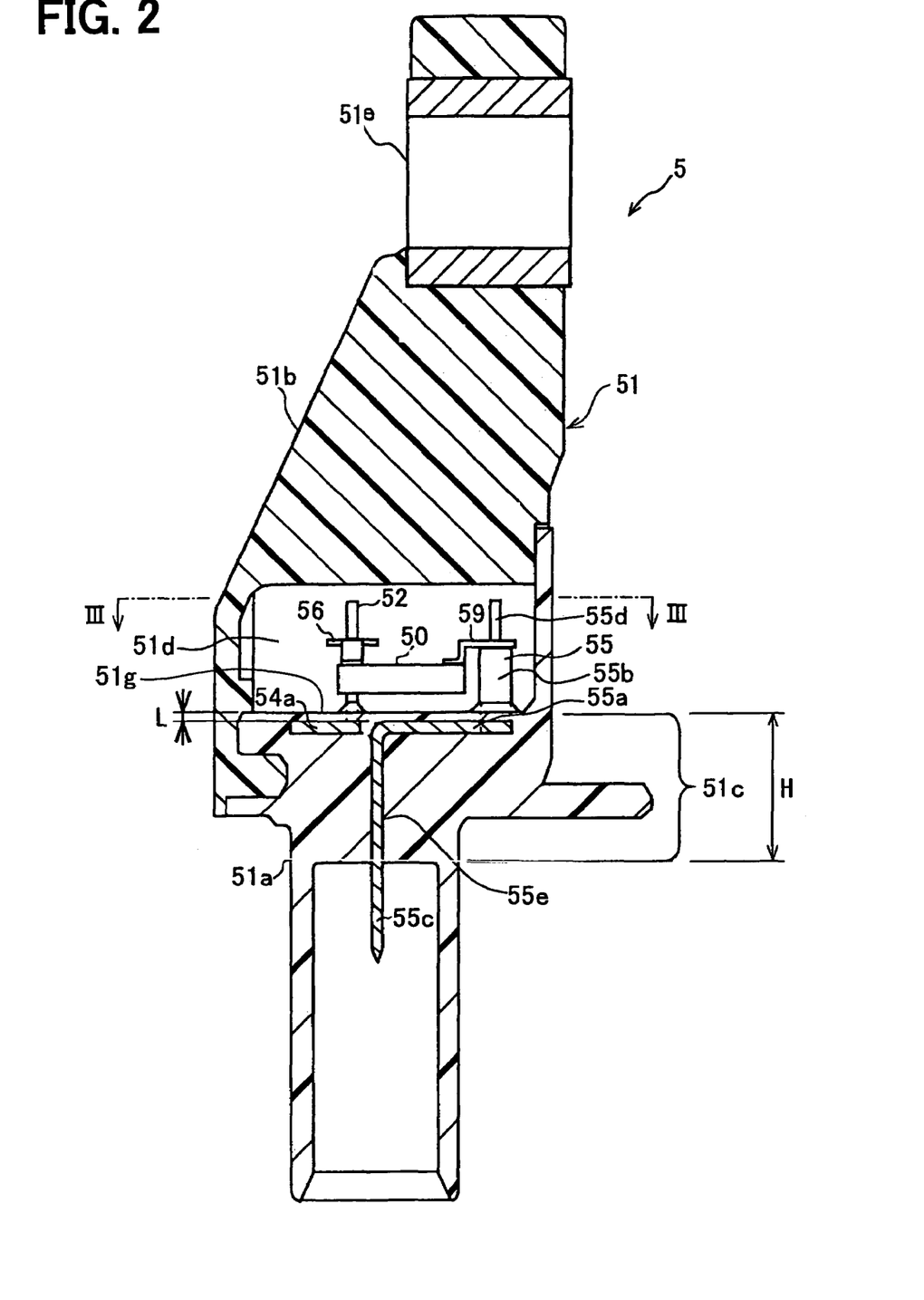
FIG. 2 is a cross-sectional view of one of the sensor devices according to the example embodiment of the present invention.
Figure 3:
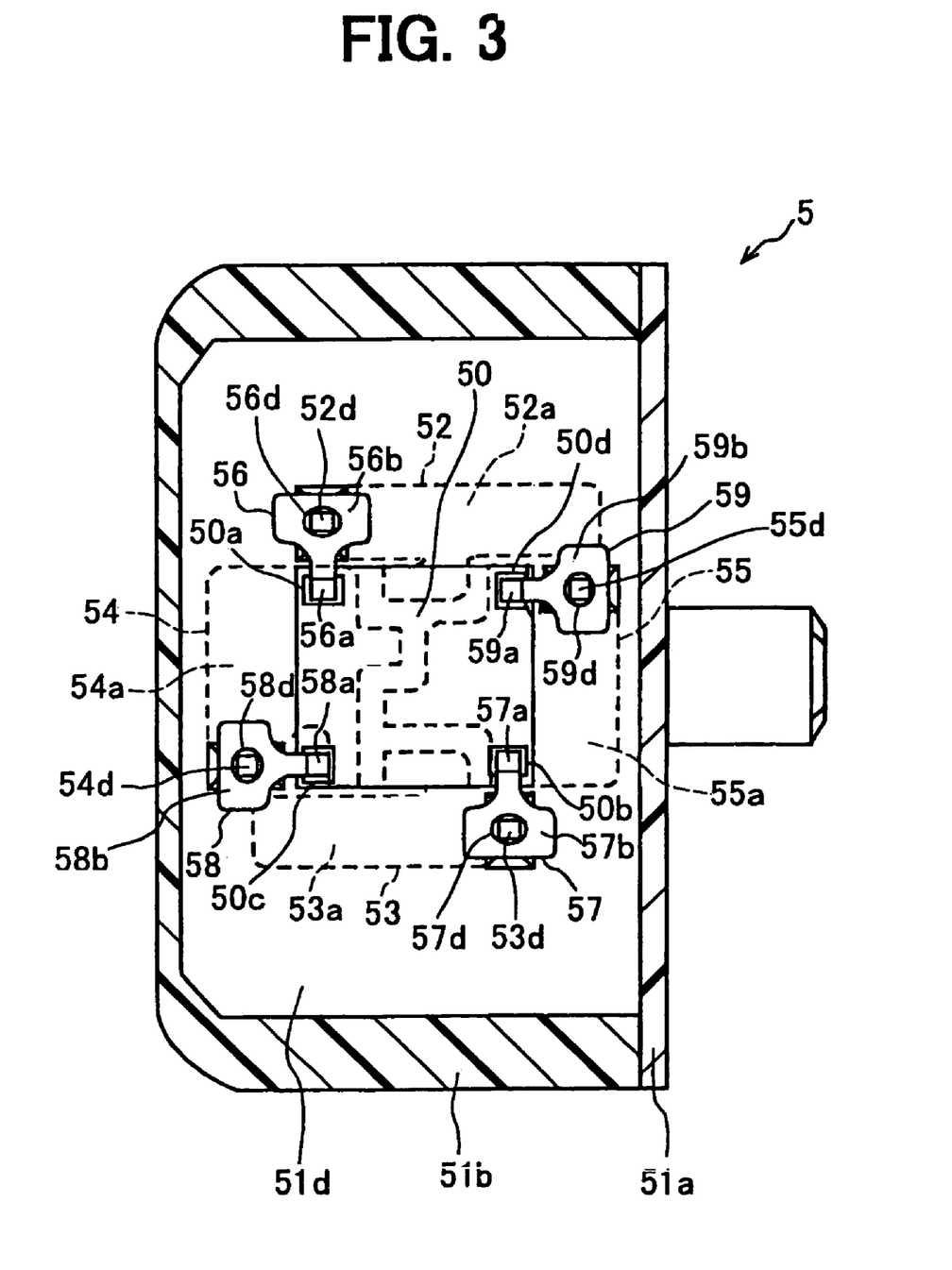
FIG. 3 is a cross-sectional view of the sensor device taken along a line III-III in FIG. 2.

As shown in FIGS. 2 and 3, the sensor device 5 has an acceleration sensor 50 as a sensing portion, a connector case 51, a first connector terminal 52, a second connector terminal 53, base connector terminals 54, 55, and first to fourth leads 56 to 59.

The acceleration sensor 50 detects acceleration in a predetermined direction. Also, the acceleration sensor 50 transmits detected acceleration as in data according to the data transmission request command transmitted from the air bag ECU 2.

As shown in FIG. 3, the acceleration sensor 50 has generally a rectangular shape. The acceleration sensor 50 has a first terminal portion 50a and a second terminal portion 50b at diagonally opposite corners of the rectangular shape. Further, the acceleration sensor 50 has base terminal portions 50c, 50d at remaining diagonally opposite corners of the rectangular shape.

When the data transmission request command is inputted in the first terminal portion 50a, the acceleration sensor 50 determines an object of communication. When the acceleration sensor 50 determines that acceleration sensor 50 itself is the communication object, it transmits the detected acceleration data from the first terminal portion 50a.

Further, the acceleration sensor 50 transmits the data transmission request command, which is inputted in the first terminal portion 50a, from the second terminal portion 50b. Furthermore, the acceleration sensor 50 transmits data, which is inputted in the second terminal portion 50b, from the first terminal portion 50a. Here, the base terminal portions 50c, 50d send and receive base signals that provide basis of signals transmitted through the first terminal portion 50a and the second terminal portion 50b. The base terminal portions 50c, 50d are connected to each other in the acceleration sensor 50.

As shown in FIGS. 2 and 3, the first connector terminal 52, the second connector terminal 53, and the base connector terminals 54, 55 are fixed to the connector case 51. Also, the acceleration sensor 50 is housed in the connector case 51.

For example, the connector case 51 is made of resin and includes a first case member 51a and a second case member 51b. The first case member 51a includes a connector terminal fixing portion 51c in which fixed portions 52d to 55d of the first connector terminal 52, the second connector terminal 53, and the base connector terminals 54, 55 are embedded by integrally molding with the first case member 51a.

Each of the first case member 51a and the second case member 51b has a hollow space. The first case member 51a and the second case member 51b are joined to each other such that a cavity is defined by the hollow spaces as a sensor housing portion 51d. The acceleration sensor 50 is accommodated in the sensor housing portion 51d.

Further, a metallic bush 51e is integrated with the end of the second case member 51b. The metallic bush 51e has a cylindrical shape. For example, the connector case 51 is mounted to the vehicle by fastening a bolt into a hole of the metallic bush 51e.

The first connector terminal 52, the second connector terminal 53, and the base connector terminals 54, 55 are metallic conductive members. The connector terminals 52 to 55 are connected to the acceleration sensor 50 through leads 56 to 59 so as to electrically connect the acceleration sensor 5 with the first communication bus 3.

For example, the first connector terminal 52 electrically connects the first terminal portion 50a of the acceleration sensor 50 with the transmission line 3b that connects to the air bag ECU 2. The second connector terminal 53 electrically connects the second terminal portion 50b with the transmission line 3b that connects to the sensor device 6.

Likewise, the base connector terminal 54 connects the base terminal portion 50c with the base communication line 3a that connects to the air bag ECU 2. The base connector terminal 55 connects the base terminal portion 50d with the base communication line 3a that connects to the second sensor device 6.

Figure 4A:
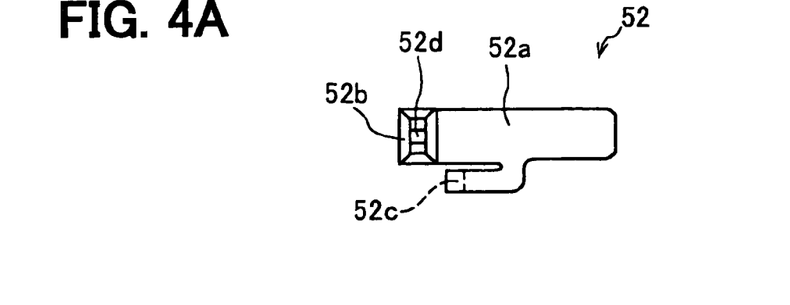
FIG. 4A is a top view of a first connector terminal of the sensor device, when viewed from a top side of FIG. 2, according to the example embodiment of the present invention.
Figure 4B:
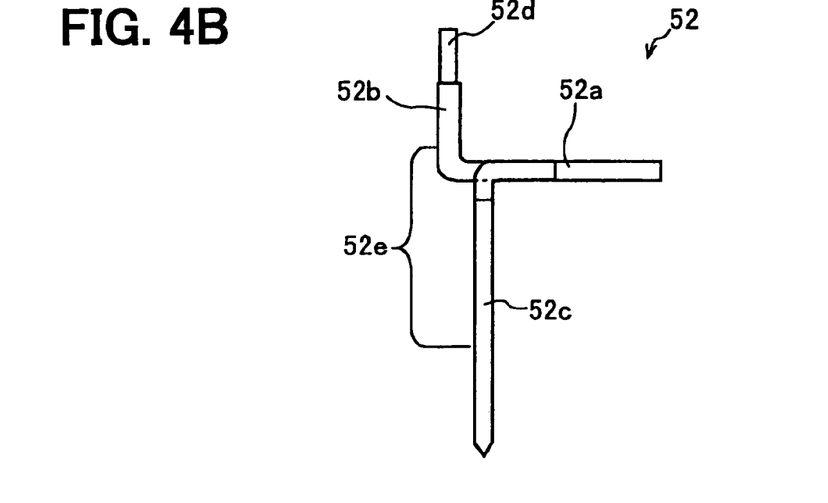
FIG. 4B is a front view of the first connector terminal according to the example embodiment of the present invention.
Figure 4C:
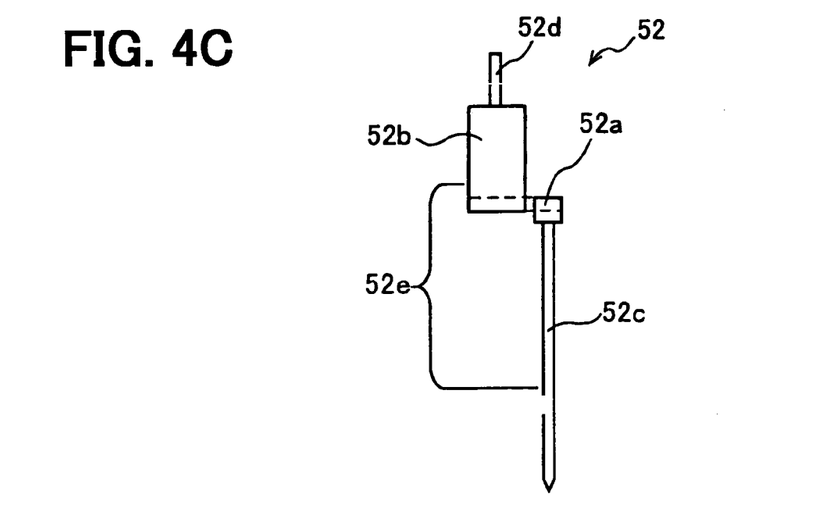
FIG. 4C is a side view of the first connector terminal according to the example embodiment of the present invention.

As shown in FIGS. 4A to 40, the first connector terminal 52 has a base wall 52a, a sensor connecting portion (first connecting portion) 52b, and a contact portion (second connecting portion) 52c to be connected to an external device. The base wall 52a has a plate shape, As shown in FIG. 4A, the base wall 52a includes a first portion having a rectangular shape and a second portion. The second portion extends from a substantially middle position of the rectangular first portion and bends in a direction parallel to a longitudinal direction of the rectangular first portion.

As shown in FIGS. 4B and 40, the sensor connecting portion 52b extends from an end of the rectangular first portion of the base wall 52a in a direction perpendicular to a plane of the base wall 52a. The sensor connecting portion 52b has a plate shape, as shown in FIG. 40. Further, the sensor connecting portion 52b has a projection 52d at an end thereof.

The contact portion 52c extends from an end of the second portion of the base wall 52a in a direction perpendicular to the rectangular first portion, opposite to the sensor connecting portion 52b. The contact portion 52c has a narrow plate shape.

The base wall 52a, the sensor connecting portion 52b and the contact portion 52c are produced by shaping and bending a plate member having an equal thickness. The base wall 52a, a part of the sensor connecting portion 52b, which is adjacent to the base wall 52a, and a part of the contact portion 52c, which is adjacent to the base wall 52a, correspond to a fixed portion 52e to be fixed in the fixing portion 51c of the first case member 51a. Namely, the base wall 52a, the part of the sensor connecting portion 52b and the part of the contact portion 52c are embedded in the fixing portion 51c of the first case member 51a by integrally molding.

In the fixed portion 52e, a ratio of the sensor connecting portion 52b to the fixed portion 52e is very small. Also, the contact portion 52c is narrow. As such, the volume of the fixed portion 52e is generally defined by the volume of the base wall 52a.

Figure 5A:
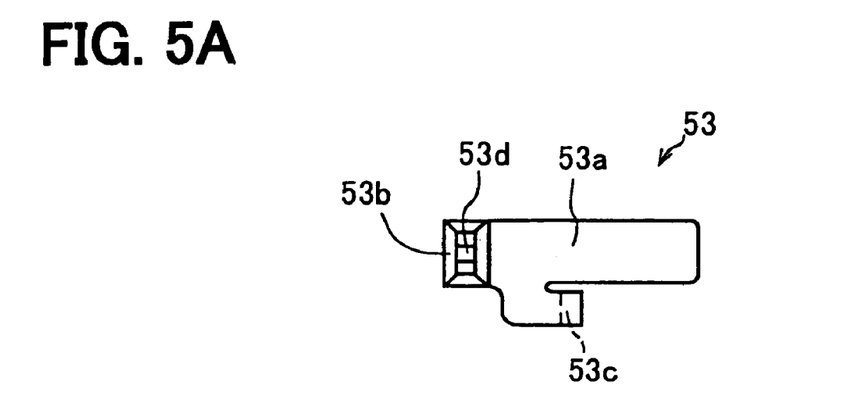
FIG. 5A is a top view of a second connector terminal of the sensor device, when viewed from the top side of FIG. 2, according to the example embodiment of the present invention.

As shown in FIG. 5A, the second connector terminal 53 has a base wall 53a, a sensor connecting portion 53b and a contact portion 53c, similar to the first connector terminal 52. Likewise, each of the base connector terminals 54, 55 has a base wall 54a, 55a, a sensor connecting portion 54b, 55b and a contact portion 54c, 55c, as shown in FIGS. 5B and 50.

Further, each of the sensor connecting portions 53b to 55b has a projection 53d to 55d at an end, similar to the projection 52d of the first connector terminal 52. Each of the connector terminals 53 to 55 is produced by shaping and bending a plate member having an even thickness, in a manner similar to the first connector terminal 52. Further, the volume of a fixed portion 53e to 55e of each connector terminal 53 to 55 is generally defined by the volume of the base wall 53a to 55a, similar to the first connector terminal 52.

Figure 5B:
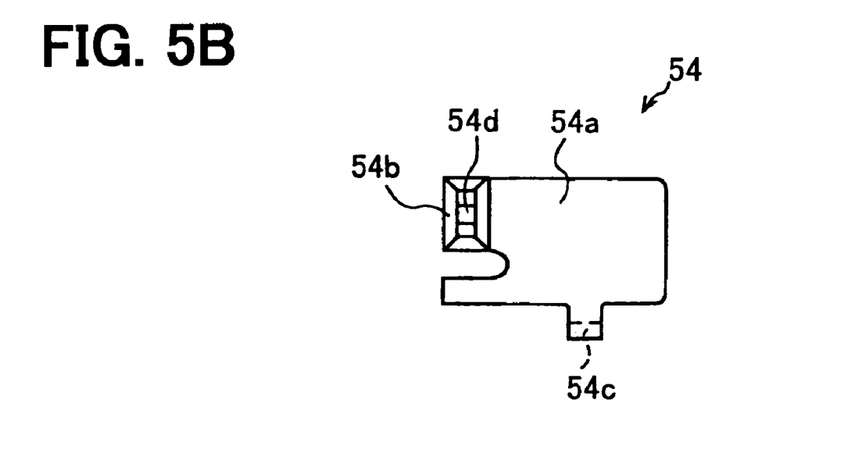
FIG. 5B is a top view of a base connector terminal of the sensor device, when viewed from the top side of FIG. 2, according to the example embodiment of the present invention.
Figure 5C:
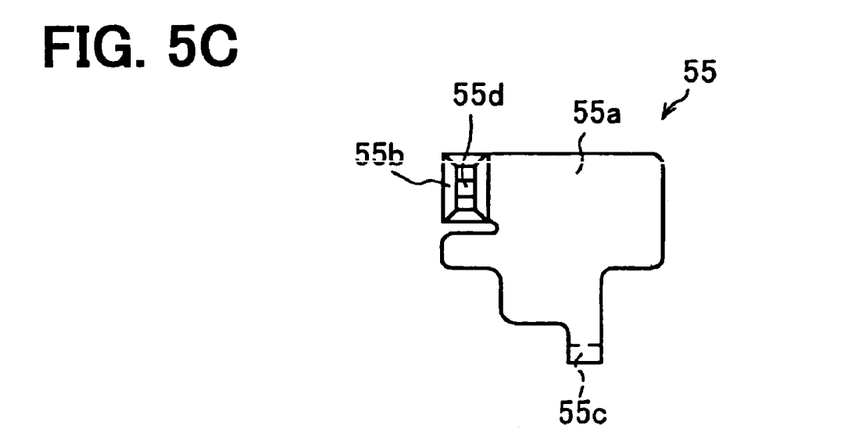
FIG. 5C is a top view of another base connector terminal of the sensor device, when viewed from the top side of FIG. 2, according to the example embodiment of the present invention.

The shapes of the base walls 53a to 55a of the connector terminals 53 to 55 are different from the shape of the base wall 52a of the first connector terminal 52, as shown in FIGS. 5A to 5C. The connector terminals 53 to 55 have configurations similar to that of the first connector terminal other than the shape of the base walls 53a to 55a. Accordingly, detailed descriptions of the connector terminals 53 to 55 will not be repeated.

The first connector terminal 52, the second connector terminal 53 and the base connector terminals 54, 55 are arranged, as shown in FIG. 3. Specifically, the projections 52d to 55d are opposed to the terminal portions 50a to 50d of the acceleration sensor 50 with respect to the respective sides of the acceleration sensor 50, respectively. Further, as shown in FIG. 2, the fixed portions 52e to 55e are fixed in the fixing portion 51c of the first case member 51a, by integrally molding.

For example, the fixed portion 52e of the first connector terminal 52 is embedded in the fixing portion 51c of the case 51 such that a surface of the base wall 52a, which is on a side of the sensor connecting portion 52b, is located in a depth L from a surface 51g of the fixing portion 51c, which defines the cavity of the sensor housing portion 51d. Namely, a resin wall having a thickness L is formed along the base wall 52a on the side of the acceleration sensor 50. The fixed portions 53e to 55e of the connector terminals 53 to 55 are embedded in the fixing portion 51c of the case 51, similar to the fixed portion 52e of the first connector terminal 52.

The first to fourth leads 56 to 59 are conductive members for connecting the terminal portions 50a to 50d of the acceleration sensor 50 to the connector terminals 52 to 55, respectively. Each of the leads 56 to 59 has a general plate shape.

Figure 6A:
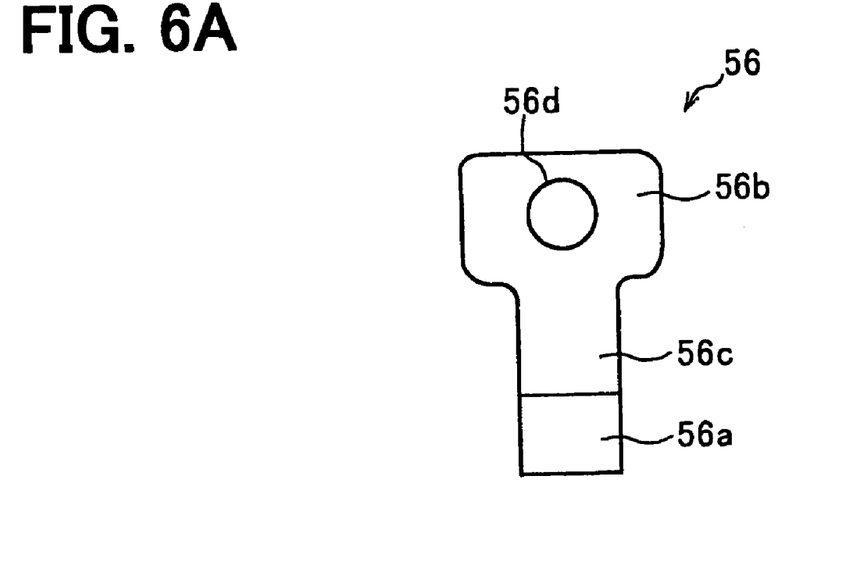
FIG. 6A is a top view of a lead of the sensor device, when viewed from the top side of FIG. 2, according to the example embodiment of the present invention.
Figure 6B:
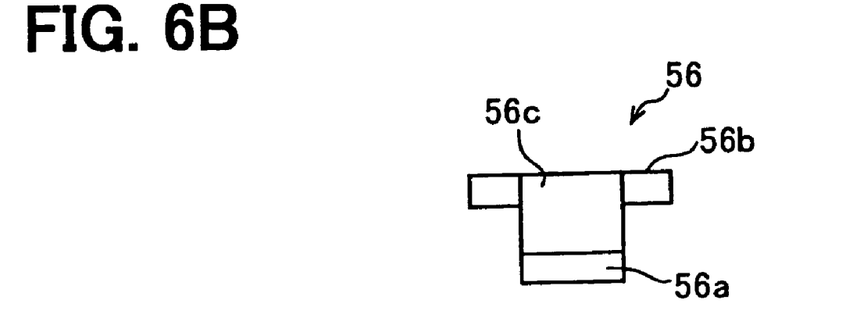
FIG. 6B is a front view of the lead according to the example embodiment of the present invention.
Figure 6C:
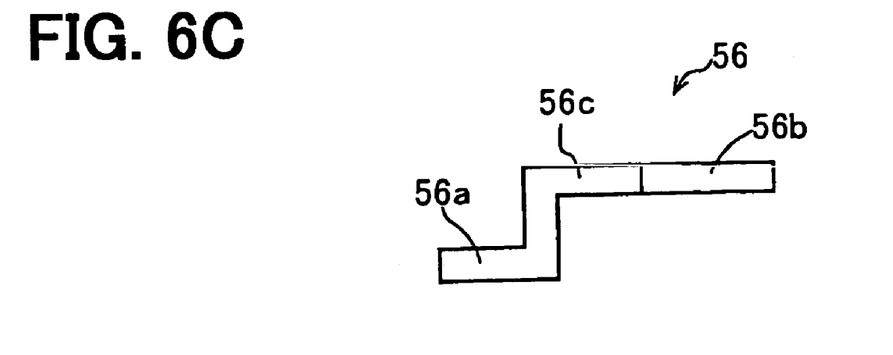
FIG. 6C is a side view of the lead according to the example embodiment of the present invention.

As shown in FIGS. 6A to 6C, the first lead 56 has a sensor connecting portion 56a, a terminal connecting portion 56b, and a base portion 56c between the sensor connecting portion 56a and the terminal connecting portion 56b. Further, the terminal connecting portion 56b forms a through hole 56d. For example, the sensor connecting portion 56a and the base portion 56c have a step between them to correspond to a height difference between the acceleration sensor 50 and the sensor connecting portion 52b of the first connector terminal 52.

The second to fourth leads 57 to 59 have the same shape as the first lead 56. Namely, the second to fourth leads 57 to 59 have sensor connecting portion 57a to 59a, terminal connecting portions 57b to 59b and base portions 57c to 59c, respectively. Further, the terminal connecting portions 57b to 59b form through holes 57d to 59d, respectively.

As shown in FIG. 3, the sensor connecting portion 56a of the first lead 56 is soldered to the first terminal portion 50a of the acceleration sensor 50. The terminal connecting portion 56b of the first lead 56 is soldered to the projection 52d of the sensor connecting portion 52b of the first connector terminal 52 in a condition that the projection 52d passes through the through hole 56d.

The sensor connecting portion 57a of the second lead 57 is soldered to the second terminal portion 50b of the acceleration sensor 50. Also, the terminal connecting portion 57b of the second lead 57 is soldered to the projection 53d of the sensor connecting portion 53b of the second connector terminal 53 in a condition that the projection 53d passes through the through hole 57d.

The sensor connecting portions 58a, 59a of the third and fourth leads 58, 59 are soldered to the base terminal portions 50c, 50d of the acceleration sensor 50, respectively. Also, the terminal connecting portions 58b, 59b of the third and fourth leads 58, 59 are soldered to the projections 54d, 55d of the sensor connecting portions 54b, 55b in a condition that the projections 54d, 55d pass through the through holes 58d, 59d.

Further, it is designed such that a ratio of a total volume of the fixed portions 52e to 55e of the connector terminals 52 to 55 to the volume of the terminal fixing portion 51c is equal to or greater than a predetermined ratio. As described in the above, the volume of each fixed portion 52e to 55e of the connector terminals 52 to 55 is generally defined by the volume of the base walls 52a to 55a. For example, it is designed such that a total area of the base walls 52a to 55a is equal to or larger than a predetermined area.

Also, it is designed such that the volume of the resin wall between the surfaces of the base walls 52a to 55a and the surface 51g of the fixing portion 51c is equal to or smaller than a predetermined volume. For example, it is designed such that the thickness L of the resin wall is equal to or smaller than a predetermined thickness corresponding to the predetermined volume. The predetermined ratio and the predetermined volume are determined to appropriate values so that connecting portions between the connector terminals 52 to 55 and the leads 56 to 59 and between the leads 56 to 59 and the terminal portions 50a to 50d of the acceleration sensor 50 are not damaged, in view of a temperature range in use condition.

Next, operation of the air bag system 1 will be described with reference to FIG. 1. When the ignition switch 12 is turned on, electric power is supplied to the air bag ECU 2 from the battery 13, so the air bag ECU 2 starts operation. The air bag ECU 2 supplies the electric power to the sensor devices 5 to 8 through the communication buses 3, 4, so the sensor devices 5 to 8 start operations. Then, the air bag ECU 2 serially transmits the data transmission request commands to the sensor devices 5 to 8 through the communication buses 3, 4.

When receiving the data transmission request commands, the sensor devices 5 to 8 determine whether the sensor devices 5 to 8 are the communication object. When the sensor devices 5 to 8 determine that themselves are the communication object, the detected acceleration data is serially transmitted to the air bag ECU 2. The air bag ECU 2 triggers the driver seat air bag 9, the front passenger seat air bag 10, and the side air bags 11 based on the acceleration detected in the sensor mounted therein and the acceleration detected by the sensor devices 5 to 8, to thereby protect passengers.

According to the example embodiment, the fixing portion 51c of the case 51 is made of resin having a coefficient of liner expansion larger than that of the metallic fixed portions 52e to 55e of the connector terminals 52 to 55. The ratio of the total volume of the fixed portions 52e to 55e to the volume of the fixing portion 51c is equal to or greater than the predetermined ratio. As such, stresses that are applied to the connector terminals 52 to 55 due to the thermal expansion and thermal contraction of the resinous first case member 51a are reduced, without requiring additional elements and changing materials.

Accordingly, it is less likely that the respective connecting portions between the acceleration sensor 50, the leads 56 to 59 and the connector terminals 52 to 55 will be damaged. Further, the reliability of the sensor devices 5 to 8 improves.

In the above example embodiment, the total volume of the fixed portions 52e to 55e of the connector terminals 52 to 55 is adjusted by determining the total area of the base walls 52a to 55a equal to or greater than the predetermined area. As such, the ratio of the total volume of the fixed portions 52e to 55e to the volume of the fixing portion 51c is simply and surely set equal to or greater than the predetermined ratio.

Also, the thickness L of the resin wall between the wall 51g of the fixing portion 51c and the base walls 52a to 55a is set equal to or less than the predetermined thickness. Accordingly, the volume of resin between the sensor housing portion 51d and the base walls 52a to 55a is reduced. Therefore, the stresses applied to the connector terminals 52 to 55 due to the thermal expansion and contraction are reduced.

Furthermore, stresses to the connector terminals 52 to 55 and the connecting portions thereof can be reduced by designing the fixing portion 51c and the fixed portions 52d to 55d in the following manners.

For example, as shown in FIG. 2, the fixing portion 51c has a dimension H defined in a direction perpendicular to the surface 51g. The thickness L of the resin wall is equal to or smaller than one third of the dimension H ($L \leq \frac{1}{3}H$). In other words, the base walls 52a to 55a of the connector terminals 52 to 55 are embedded in a predetermined depth L from the surface 51g of the fixing portion 51c. The predetermined depth L is for example equal to or smaller than one third of the dimension H. Here, the thickness L is for example 0.5 mm. The dimension H is for example 4.0 mm.

Accordingly, the volume of resin between the sensor housing portion 51d and the base walls 52a to 55a is reduced. Therefore, the stresses applied to the connector terminals 52 to 55 due to the thermal expansion and contraction of resin are reduced.

For example, a total area of the base walls 52a to 55a of the fixed portion 52e to 55e of the connector terminal 52 to 55 is equal to or greater than one third of a cross sectional area of the fixing portion 51c of the case 51a, 51b. in a cross section defined in a direction parallel to the base walls 52a to 55a (e.g., FIG. 3) and at a position corresponding to the base wall. With this, the volume of resin at the position corresponding to the base walls 52a to 55a is reduced. Therefore, the stresses applied to the connector terminals 52 to 55, in particular, applied to the connecting portions, due to the thermal expansion and contraction of resin are reduced.

It is not always necessary that the ratio of the total volume of the fixed portions 52e to 55e of the connector terminals 52 to 55 to the volume of the fixing portion 51c of the case 51 is equal to or greater than the predetermined ratio. Alternatively, a ratio of the volume of only one of or some of the fixed portions 52e to 55e to the fixing portion 51c of the case 51 can be set equal to or greater than a predetermined ratio. Also in this case, similar advantageous effects can be provided.

In the above example embodiment, the sensor device 50 has four connector terminals. However, the number of the connector terminals is not limited to four.

One example embodiment of the present invention is described above. However, the present invention is not limited to the above example embodiment, but may be implemented in other ways without departing from the spirit of the invention.

What is claimed is:

1. A sensor device comprising:
   a sensing portion;
   a case forming a housing portion in which the sensing portion is housed and a fixing portion; and
   a connector terminal electrically connected to the sensing portion through a lead for allowing signal transmission between the sensing portion and an external device, wherein
   the connector terminal has a fixed portion fixed to the fixing portion of the case, and
   the fixed portion has a base wall fixed in the fixing portion of the case, and the base wall has a cross sectional area equal to or greater than one third of a cross sectional area of the fixing portion of the case taken in a direction parallel to the base wall.

2. The sensor device according to claim 1, wherein the case is made of resin and the connector terminal is made of metal.

3. The sensor device according to claim 1, wherein
   the connector terminal has a first connecting portion and a second connecting portion,
   the first connecting portion extends from an end of the base wall in a direction substantially perpendicular to the base wall and electrically connected to the sensing portion through the lead,
   the second connecting portion extends from the base wall in a direction opposite to the first connecting portion to be electrically connected to the external device.

4. The sensor device according to claim 3, wherein the base wall has an area equal to or greater than a predetermined area with respect to a cross sectional area of the fixing portion of the case that overlies the base wall and underlies a sensor enclosure of the case housing taken in a direction parallel to the base wall.

5. The sensor device according to claim 3, wherein the fixed portion of the connector terminal is embedded in the fixing portion of the case such that a resin wall is defined between the housing portion and the base wall of the fixed portion of the connector terminal, wherein a volume of the resin wall is equal to or smaller than a predetermined volume.

6. The sensor device according to claim 5, wherein the resin wall has a thickness equal to or smaller than a predetermined thickness.

7. The sensor device according to claim 1, wherein the base wall of the fixed portion of the connector terminal has a base wall embedded in the fixing portion of the case in a predetermined depth from a surface of the wall of the fixing portion, wherein the predetermined depth is equal to or smaller than one third of a dimension of the fixing portion of the case in a direction perpendicular to the wall of the fixing portion.

8. A sensor device comprising:
   a case defining a cavity and including a terminal fixing portion, the fixing portion having a first surface that faces the cavity and a second surface opposite to the first surface;
   a sensing portion disposed in the cavity of the case;
   connector terminals partly embedded in the terminal fixing portion of the case, each of the connector terminals has a base wall, a first connecting portion, and a second connecting portion, the base wall embedded in the terminal fixing portion substantially parallel to the first surface of the fixing portion, the first connecting portion extending from the base wall in a direction substantially perpendicular to the base wall and projects into the cavity through the first surface, and the second connecting portion extending from the base wall in a direction opposite to the first connecting portion to be electrically connected to an external device; and
   leads connecting the first connecting portions of the connector terminals with the sensing portion within the cavity of the case, wherein
   the base walls of the connector terminals are substantially coplanar within the terminal fixing portion, and
   a total area of the base walls is equal to or greater than one third of a cross-sectional area of the terminal fixing portion in a cross-section taken along the base walls of the connector terminals.

9. The sensor device according to claim 8, wherein
   the case includes a connector portion extending from the second surface of the terminal fixing portion on a side opposite to the cavity,
   the connector portion defines a chamber and the second connecting portions of the connector terminals project from the second surface into the chamber of the connector portion, wherein
   the base walls of the connector terminals are embedded in a predetermined depth from the first surface, and the predetermined depth is equal to or less than one third of a thickness of the terminal fixing portion between the first surface and the second surface.

* * * * *